United States Patent [19]
Allen

[11] Patent Number: 4,733,625
[45] Date of Patent: Mar. 29, 1988

[54] QUICK RELEASE COUPLING DEVICE FOR ANCHOR ROPES

[76] Inventor: William W. Allen, 17421 Del Mar Way, Penn Valley, Calif. 95946

[21] Appl. No.: 45,401

[22] Filed: May 4, 1987

[51] Int. Cl.⁴ .......................................... B63B 21/00
[52] U.S. Cl. ..................................... 114/230; 24/602; 114/247; 403/289
[58] Field of Search ............... 114/216, 217, 247, 253, 114/254, 250, 230; 403/289, 290; 24/115 F, 640, 681, 602

[56] References Cited

U.S. PATENT DOCUMENTS 2,327,951  8/1943  Zaleske ............................... 403/289
3,540,089  11/1970  Franklin ............................... 24/602

Primary Examiner—Sherman D. Basinger
Attorney, Agent, or Firm—John J. Leavitt

[57] ABSTRACT

Presented is a coupling device designed to release two members that are connected together when more than a predetermined force is exerted to separate the two members. The coupling device is adjustable to increase or decrease the amount of force to which it responds. Structurally, the device includes a plug member having a spherical knob seated in a complementary seat formed in a surrounding tube having longitudinal slits. A sleeve surrounding the tube is slidable between maximum and minimum force settings to control the amount of force required to separate a member connected to the plug member from another member connected to the tube.

7 Claims, 10 Drawing Figures

QUICK RELEASE COUPLING DEVICE FOR ANCHOR ROPES

BACKGROUND OF THE INVENTION

1. Field of the Invention

This invention relates to coupling devices, and particularly to a coupling device that provides controlled separability of the coupling device when more than a predetermined amount of force is exerted on the coupling device.

2. Description of the Prior Art

The prior art relating to this invention is believed to reside in the following classes and sub-classes:

| Class 114 | Sub-classes 210 and 217; |
| Class 280 | Sub-class 450; |
| Class 74  | Sub-class 2; |
| Class 24  | Sub-class 115F; and |
| Class 180 | Sub-class 141.5. |

A preliminary patentability search conducted through these classes and sub-classes has revealed the existence of the following United States patents:

| | |
|---|---|
| 1,612,578 | 2,036,953 |
| 2,562,817 | 2,971,776 |
| 3,077,114 | 3,205,716 |

U.S. Pat. No. 1,612,578 relates to a metal draft appliance of the type that might be used to connect a tractor to a trailer or wagon, or a truck to a vehicle being towed. Structurally, the device includes a main cylindrical bore adapted to receive therein a connecting bar provided with two beveled seats at one end. Connecting with the main cylindrical bore are two angularly disposed cylindrical bores within which are contained coil springs having lock pins abutting the beveled seats on the connecting bar. When more than a predetermined amount of force is applied to the connecting bar, the beveled seats impose an axial thrust on the lock pins, which retract, thus compressing the coil springs. Ultimately, the lock pins are retracted sufficiently to permit the connecting bar to pass from the cylindrical bore.

U.S. Pat. No. 2,036,953 teaches a release mechanism used in conjunction with farm equipment, and is adapted to connect an implement control rope to the seat of a tractor in such a way that if the implement becomes detached from the tractor, the control rope will be released instead of broken. The release mechanism comprises a bracket attached to the tractor seat, with a cylindrical member mounted on the bracket. Mounted on the cylindrical member at right angles thereto is a second cylindrical member enclosing a spring and a lock pin that is resiliently biased toward the first cylindrical member. A pin within the first cylindrical member is provided with a circumferential groove into which the lock pin is seated under the impetus of the spring. When more than a predetermined amount of force is exerted on the pin, which is tied to the control rope, the side walls of the groove function as a cam to cause retraction of the lock pin against the force of the spring, ultimately releasing the pin and the control rope.

U.S. Pat. No. 2,562,817 also relates to a farm implement hitch in which the implement is connected to the tractor by a spaced pair of parallel tubular members that telescope into a complementary pair of tubular members mounted on the tractor. Extending transversely between the two sets of telescoped tubular members is a spring pressed detent assembly providing spherical balls at each end that are urged into apertures in the tubular members attached to the implement. When too much drag is imposed by the implement, the balls are cammed into retracted position against spring pressure, thus releasing the telescoped tubular members and permitting separation of the implement from the tractor. A tether connected between the implement and the tractor clutch lever, functions to actuate release the clutch, thus stopping the tractor.

U.S. Pat. No. 2,971,776 also relates to a tractor hitch in which the implement being drawn is released from the tractor upon the application of a predetermined separating force. Structurally, this device includes a tube within which is positioned two annular cam members spaced apart axially and having disposed therebetween in a circular array, two rows of steel balls constituting cam actuators. In the recesses between the steel balls are positioned a series of smaller cam follower balls which impinge on the two rows of steel balls on the one hand and on a reduced diameter section of a connector rod extending axially through the annular cam members and the array of balls. Axial displacement of the connector rod effects a camming action on the small balls, which in turn cam the two rows of larger steel balls apart against the pressure of a spring.

U.S. Pat. No. 3,077,114 relates to a release device which disconnects two lines when more than a predetermined amount of tension is imposed on the lines. In this device, one line is connected to a rod threaded at one end and extending into a cylindrical housing containing a spring surrounding the rod below an abutment plate threaded on the rod. The rod passes through a latch bar pivoted at one end on the housing and at its free end engaging a latch lever also pivoted on the housing. The inner end of the rod is provided with a nut which when pulled against the latch bar disengages the latch bar from the latch lever, which pivots in a manner to release one of the lines.

U.S. Pat. No. 3,205,716 is by the same inventor as the previous patent, and constitutes an improvement of the structure described above in connection with that patent. As in the previous patent, a threaded rod connected to a line is tensioned and upon displacement causes pivotal movement of a latch lever, which is in turn releasably hooked over the end of a release lever. Lateral displacement of the latch lever disengages this lever from the release lever, permitting the tension on the other line to pivot the release lever into a position in which it releases the other line.

From these prior art patents it will be seen that there has been a need for many years for a quick release coupling device that will effect the disconnection of two connected members under specific conditions, usually involving the unexpected imposition of a force tending to separate the connected members. As indicated by the patents listed above, all of the devices of the prior art relate to metallic devices that are heavy and complicated in that they include numerous interrelated parts. Accordingly, it is one of the objects of this invention to provide a quick release coupling that is fabricated totally from plastic.

Another object of the invention is the provision of a quick release device that is particularly applicable for use in connecting a boat to a bouy or anchor.

Still another object of the invention is the provision of a quick release coupling device utilizing only three interconnected parts to effectively connect a boat to an anchor or bouy.

A still further object of the invention is the provision of a quick release coupling device in which decoupling or release upon application of tension beyond a predetermined amount results from elastic deformation of one of the three interconnected parts to effect release of one of the parts.

Yet another object of the invention is the provision of a quick release coupling device which may be adjusted to respond to greater or lesser tension to effect release, and which adjustment may be made without use of tools of any kind.

A still further object of the invention is the provision of a quick release coupling device having an adjustment sleeve that may be manipulated to adjust the amount of tension required to effect release of the coupling, and which incorporates means for locking the adjustment sleeve in its adjusted position.

Still another object of the invention is the provision of a quick release coupling device provided with numerical indicia correlated to positions of an adjustment sleeve and representative of the different force levels at which the coupling device may be set to effect release.

The invention possess other objects and features of advantage, some of which, with the foregoing, will be apparent from the following description and the drawings. It is to be understood however that the invention is not limited to the embodiment illustrated and described since it may be embodied in various forms within the scope of the appended claims.

SUMMARY OF THE INVENTION

In terms of broad inclusion, the quick release coupling device of the invention comprises a composite structure fabricated from injection molded plastic and including an elongated tubular body having an integral eye at one end and longitudinally extending slits extending from the open end of the tubular body toward the closed end thereof for most of the length of the tubular body. At the open end of the tubular body remote from the eye, the inner periphery of the tubular body is provided with a circumferential recess in each of the three segments of the tubular body. An injection molded eye member is connected by a stem to a spherical cam adapted to seat in the circumferential recess formed in the inner periphery of the tubular body. To control the elastic flexure of the tubular body segments separated by the slits, there is slidably position over the tubular body an adjustment sleeve that may be locked in selected positions along the tubular body. The sleeve forms a snug slip fit over the outer periphery of the tubular body, and means are provided on the sleeve interacting with a boss on the tubular body to lock the sleeve in selected positions to either reduce or increase the amount of force required to pull the spherical knob from the interior of the tubular body. Numerical indicia on the sleeve are correlated to the different positions in which the sleeve may be locked and the amount of force required to be imposed on the eyes to pull the spherical knob from its seat.

DESCRIPTION OF THE PREFERRED EMBODIMENT

Figure 1:
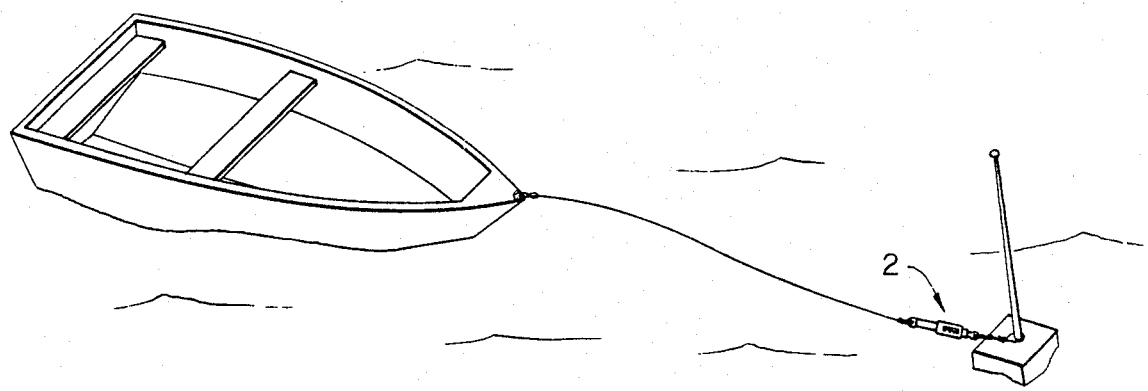
FIG. 1 is a perspective view illustrating the quick release coupling device of the invention utilized to anchor a boat to a floating bouy.

In terms of broad inclusion, the quick release coupling device of the invention comprises an elongated assembly designated generally by the numeral 2, and being generally symmetrical about a longitudinal axis 3. Preferably, the assembly components are all injection molded from a synthetic acetal resin, such as an acetal copolymer. The acetal copolymers are based upon trioxane. These acetal resins have excellent physical and mechanical properties. They are tough, strong materials with excellent retention of dimensional properties, even at elevated temperatures. These characteristics permit them to bridge the gap between metals and plastics, as in the subject invention.

The entire quick release coupling assembly 2 may be broken down into only three distinct components, each of which is preferably an injection molded component. Thus, the assembly includes an elongated tubular main body or barrel 4, generally symmetrical about the longitudinal axis, and including generally circularly arcuate elongated wall segments 6, conveniently three in number, and separated from each other by three elongated slits 7 that extend from the open end 8 of the barrel to adjacent the closed end 9 thereof. Formed integrally on the closed end 9 of the barrel or tubular main body is an eye 12 as shown, defined by a generally circular extension 13 integral with the closed end of the barrel. In use, this eye is used to connect a line to the assembly.

Figure 3:
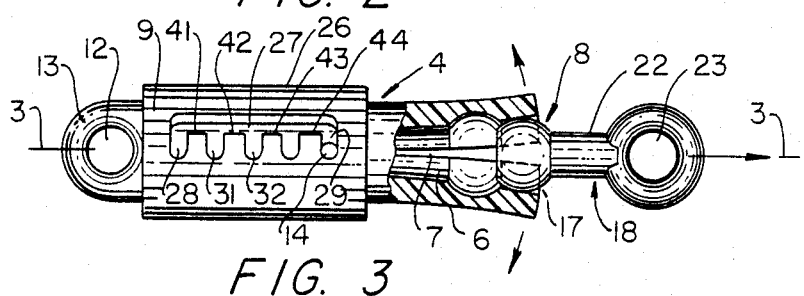
FIG. 3 is a side elevational view of the quick release coupling device showing the connector eye in the process of being released from the tubular body.
Figure 10:
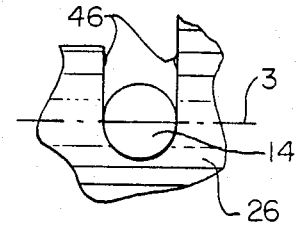
FIG. 10 is a fragmentary enlarged elevational view of a portion of the adjustment sleeve and the interlocking boss showing the means for locking the sleeve in its adjusted position.
Figure 4:
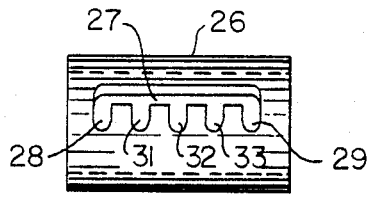
FIG. 4 is a side elevational view of the adjustment sleeve shown apart from the remaining structure.
Figure 5:
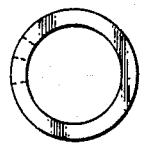
FIG. 5 is a right end view of the adjustment sleeve of FIG. 4.
Figure 6:
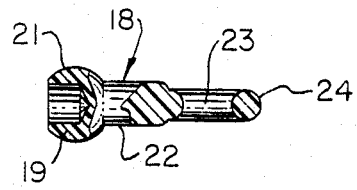
FIG. 6 is an elevational view of the connector eye apart from the remaining structure, parts being broken away and to reveal the underlying structure.
Figure 7:
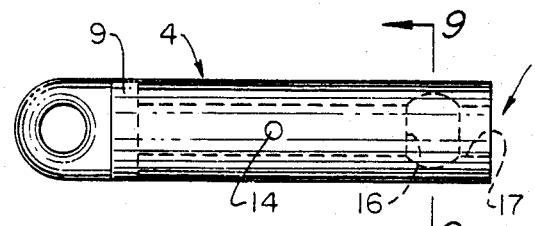
FIG. 7 is an elevational view of the tubular body apart from the remaining structure.
Figure 8:
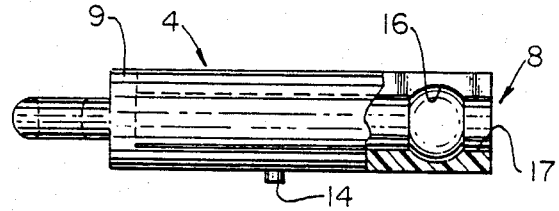
FIG. 8 is an elevational view of the tubular body of FIG. 7 rotated through 90°.

Formed intermediate the ends of one of the circularly arcuate segments and projecting radially outwardly therefrom is an integral lug or post 14, having a diameter of about 0.250 inches and a height of about 0.188 inches in a barrel having an overall length of about 6.5 inches and a diameter of about 1.375 inches. It will of course be apparent to those skilled in the art that these dimensions may be increased or decreased to suit special circumstances. Additionally, the inner peripheral surfaces of the barrel segments 6 adjacent the open end of the barrel are provided with corresponding recesses 16, the recesses being spaced inwardly from the open end sufficiently to define a shoulder 17 next adjacent the open end as illustrated in FIGS. 3, 7 and 8 for purposes which will hereinafter be explained.

Normally rotatably seated in the recesses 16 is a line release member desginated generally by the numeral 18 and including at one end a truncated spherical camming ball 19 having a spherical surface 21 corresponding generally to the configuration of the recesses 16. The camming ball is integral with a stem 22 which extends out of the end of the barrel member when the camming ball is seated in the recesses, and the end of the stem outside the barrel is provided with an integral eye 23 similar to the eye 12, being formed by a generally circular loop 24 that forms the eye. This eye is utilized to connect to a line in the same manner as the eye 12. It will thus be seen, particularly as shown in FIG. 3, that when tension is placed on the line connected to the eye 23, the camming ball exerts a radially outwardly directed component of force on the surrounding barrel segments, causing them to elastically flex outwardly as the camming ball rises onto the shoulder 17. Continued axial displacement of the camming ball will of course result in complete detachment of the line release member 18 from the barrel. It should of course be apparent that radially outward elastic flexure of the barrel segments is dependent upon there being no impediment to such flexure other than the inherent resilience of the segments themselves.

Figure 2:
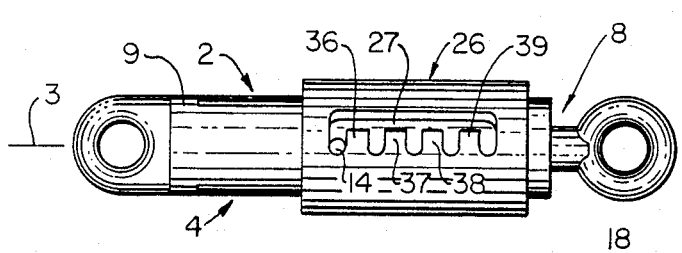
FIG. 2 is a top plan view of the quick release coupling device of the invention.
Figure 9:
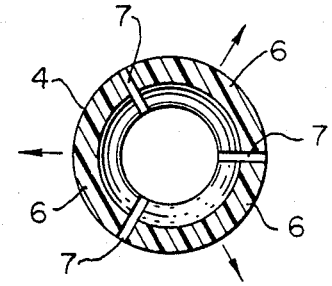
FIG. 9 is a cross-sectional view taken in the plane indicated by the line 9—9 in FIG. 7.

To provide such impediment, and particularly to provide an impediment that is adjustable to increase or decrease the amount of axially directed tension on the line release member 18 that is required to effect a release of the member 18, or to lock the member 18 so that axial displacement is not possible, there is provided on the barrel, slidably surrounding the barrel segments 6, a sleeve 26 having a length about half the length of the barrel, and injection molded from the same material as the barrel. Formed in the wall of the sleeve, is an elongated slot 27 having a width forming a snug sliding fit with the stud 14, and when the sleeve surrounds the segments, the stud lies caught in the slot 27 to permit longitudinal displacement of the sleeve from one end of the barrel to the other. Thus, as shown in FIG. 2, the sleeve 26 is at one extreme, while in FIG. 3, the sleeve is shown at the opposite extreme of its displacement. It should of course be understood that the sleeve cannot be removed because of the projection of the stud 14 into the slot 27.

To provide selective adjustability of the sleeve on the barrel, and to lock the sleeve in its adjusted position on the barrel, the slot 27 is provided at each opposite end with circumferentially extending slots 28 and 29 communicating with slot 27, and having a depth in a direction away from slot 27 of about twice the diameter of the stud 14. Intermediate the end slots 28 and 29, the wall of the sleeve is provided with a plurality of additional and evenly spaced slots 31, 32 and 33, thus providing five separate and distinct settings for the sleeve on the barrel. Obviously, additional slots, or fewer, could as well be utilized under appropriate circumstances.

Formation of the slots 31, 32 and 33, all of which possess a circumferential disposition similar to end slots 28 and 29 and parallel to these slots, define four circumferentially extending fingers 36, 37, 38 and 39 which, in fact, constitute cantilever beams, the free ends 41, 42, 43 and 44, respectively, all lying in a common plane, and forming one of the sides of the elongated slot 27. Thus, with the lock lug or stud 14 slidably disposed in the elongated slot 27, the sleeve may be slidably displaced from its extreme position as illustrated in FIG. 2 to its position at the other extreme as illustrated in FIG. 3. It will of course be apparent that since the sleeve circumscribes the barrel segments 6, the position of the sleeve along the barrel determines the length of the segments projecting from the end of the sleeve. As the length of the segments measured from the open end of the barrel becomes shorter and shorter, the impediment to flexing of the segments becomes greater and greater. One extreme of this condition is illustrated in FIG. 2 in which the lock lug or stud 14 is locked in end slot 29 and the associated end of the sleeve is very close to the open end of the barrel and the free ends of the barrel segments. In this position, the sleeve prevents the radially outwardly directed elastic flexure of the barrel segments, thus precluding axial displacement of the line release member 18, and effectively locking the truncated ball 19 within the recesses 16 so securely that no amount of tension on the line connected to the eyes 12 and 23 will cause release of the ball from its seat.

On the other hand, with the sleeve displaced to the opposite extreme, as exemplified in FIG. 3, almost half the length of the barrel segments are free to flex, thus enabling the camming ball 19 to elastically flex the segments radially outwardly as shown. In this position of the sleeve, the lock lug or stud 14 is caught in the end slot 28.

To prevent indadvertent displacement of the sleeve, which would alter the selected setting of the sleeve and alter also the amount of force required to release the line release member 18 from the barrel, the mouth of each of the end slots 28 and 29 and the intermediate slots 31, 32 and 33, are provided with a slight lug or rib 46 that projects into the mouth of the associated slot to provide a narrowing of the mouth, thus causing the stud 14, as it enters the mouth of a selected slot, to encounter the rib, resulting in the stud effectively camming the opening or mouth wider to get past the rib. Thus, to lock the stud in each of the slots, it is necessary that a slight rotational force be exerted on the sleeve while the barrel is retained against rotation. The same is true when it is desired to release the lock stud from a selected slot. In this way, once the lock stud has been engaged in one of the slots, it is extremely unlikely that any outside force other than an intentional rotation force will effect dislocation of the sleeve and inadvertent resetting of the sleeve.

It will thus be seen that a completely metal-free quick release coupling has been provided that may be used in many different environments to releasably connect two members upon the application of a predetermined force tending to separate the two members.

In its preferred form, the lock stud 14 is molded integrally with the barrel segment on which it is formed, thus maximizing the strength of the stud, even though in use, the stud does not have to withstand destructive forces. The diameter of the barrel in relation to the inner peripheral diameter of the sleeve is chosen to permit the sleeve to be press-fitted over the barrel from the open end thereof when the segment ends are constricted to close the elongated slots therebetween by application of appropriate pressure with the camming ball removed from the barrel recesses. Once the stud 14 is engaged in the slot 27, it is most difficult to reverse this procedure and remove the sleeve, even with the camming ball removed from the barrel.

Having thus described the invention, what is believed to be new and novel and sought to be protected by letters patent of the United States is as follows:

I claim:

1. A quick release coupling device adapted to control between minimum and maximum limits the separation force sustainable by the coupling device, comprising:
   (a) an elongated barrel member having inner and outer peripheries and an eye at one end to which a line may be connected and at the opposite end being open with the inner periphery of the barrel being formed with a recess spaced from the open end;
   (b) a release member coupled to the barrel member and including a stem having a camming ball at one end seated in said recess in the inner periphery of the barrel and an eye on the other end projecting from the open end of the barrel whereby tension applied in a direction to separate said eyes imposes a radially outwardly directed force on said barrel tending to expand the diameter thereof adjacent said open end;
   (c) means mounted on the barrel exteriorly thereof and selectively adjustable to control expansion of the barrel adjacent the open end thereof in response to said radially outwardly directed force whereby the amount of tension applied on said eyes to effect a predetermined expansion of said barrel sufficient to release said camming ball from said recess is controlled by controlling the amount of said radially outwardly directed force required to effect expansion of the barrel, and
   (d) a radially outwardly projecting lock stud fixed on said barrel cooperatively interconnected with said means mounted on said barrel exteriorly thereof to selectively lock said means in adjusted position.

2. The combination according to claim 1, in which said barrel member includes a plurality of elongated arcuate cantilever segments integral at one corresponding end and arranged in a cylindrical array, and said means mounted on said barrel exteriorly thereof comprises a sleeve slidably surrounding said arcuate segments and adjustable longitudinally of said arcuate segments in selective locking engagement with said lock stud to selectively control radially outward elastic displacement of said segments in response to said radially outwardly directed force imposed on said segments by said camming ball.

3. The combination according to claim 1, in which said barrel member includes a plurality of elongated arcuate cantilever segments integral at one corresponding end adjacent said eye and arranged in a cylindrical array, said lock stud is integrally formed on and projects from one of said arcuate segments generally medianly between the ends thereof, and said means mounted on said barrel exteriorly thereof comprises a sleeve surrounding said arcuate segments and including slot means therein selectively engageable by said lock stud upon selective displacement of said sleeve.

4. The combination according to claim 3, in which said slot means in said sleeve includes an elongated slot extending longitudinally of said sleeve and a plurality of longitudinally spaced circumferentially extending slots communicating with said elongated slot and defining a plurality of circumferentially extending fingers defining the mouth of each slot.

5. The combination according to claim 4, in which at least one rib is provided on each said finger and projecting into the mouth of the associated slot whereby said mouth at the location of said rib is narrowed to just under the transverse dimension of said lock stud whereby a rotational force must be exerted on said sleeve in relation to said barrel to snap said lock stud into or out of a selected one of said circumferentially extending slots.

6. The combination according to claim 1, in which said barrel member includes a plurality of elongated cantilever segments integral at one corresponding end and arranged in a cylindrical array whereby expansion of said barrel is effected by controlled separation of said cantilever segments in response to said radially outwardly directed force imposed by said camming ball in response to said tension imposed on said eyes.

7. The combination according to claim 1, in which said means mounted on said barrel exteriorly thereof comprises a sleeve surrounding the barrel and adjustable from one end of the barrel to the other to selectively control expansion of the barrel in the region of said recess.

* * * * *